United States Patent
Sadinski et al.

[11] Patent Number: 6,116,882
[45] Date of Patent: Sep. 12, 2000

[54] SEALABLE CHAMBER EXTRUSION APPARATUS WITH SEAL CONTROLS

[75] Inventors: Robert L. Sadinski, Tallmadge; Robert M. Lincoln, Jr., North Canton; Russell C. Woodburn, Stow, all of Ohio

[73] Assignee: Owens Corning Fiberglas Technology, Inc., Summit, Ill.

[21] Appl. No.: 08/999,168

[22] Filed: Dec. 29, 1997

Related U.S. Application Data

[63] Continuation-in-part of application No. 08/696,472, Aug. 14, 1996, Pat. No. 5,753,161, application No. 08/696,718, Aug. 14, 1996, Pat. No. 5,783,122, and application No. 08/916,185, Aug. 21, 1997.

[51] Int. Cl.[7] .................. B29C 47/88; B29C 47/92
[52] U.S. Cl. .................. 425/71; 425/73; 425/140; 425/141; 425/325
[58] Field of Search .................. 425/140, 141, 425/73, 71, 325

[56] References Cited

U.S. PATENT DOCUMENTS

| | | |
|---|---|---|
| 2,083,557 | 6/1937 | Crane et al. . |
| 2,191,658 | 2/1940 | Haux . |
| 2,256,483 | 9/1941 | Johnston . |
| 3,295,163 | 1/1967 | Bachus .................. 264/348 |
| 3,378,887 | 4/1968 | Reib et al. . |
| 3,428,726 | 2/1969 | Moss .................. 264/348 |
| 3,558,753 | 1/1971 | Edlin . |
| 3,704,083 | 11/1972 | Phipps . |
| 3,813,200 | 5/1974 | Gergely .................. 425/140 |
| 4,000,402 | 12/1976 | Higham .................. 425/141 |
| 4,234,529 | 11/1980 | Phipps .................. 264/101 |
| 4,371,488 | 2/1983 | Phipps et al. . |
| 4,395,214 | 7/1983 | Phipps et al. . |
| 4,428,896 | 1/1984 | Stevenson .................. 425/141 |
| 4,454,082 | 6/1984 | Cisar et al. .................. 425/141 |
| 4,469,652 | 9/1984 | Cisar et al. .................. 264/51 |
| 4,585,603 | 4/1986 | Furuta et al. .................. 264/45.9 |
| 4,626,183 | 12/1986 | Shirari et al. . |
| 4,783,291 | 11/1988 | Pagan .................. 425/71 |
| 5,120,481 | 6/1992 | Brackman et al. .................. 264/51 |
| 5,236,325 | 8/1993 | Groblacher et al. . |
| 5,340,295 | 8/1994 | Preiato et al. .................. 425/71 |
| 5,346,379 | 9/1994 | Wolfl et al. .................. 425/141 |
| 5,753,161 | 5/1998 | Lightle et al. .................. 264/51 |
| 5,783,122 | 7/1998 | Sadinski .................. 264/51 |

FOREIGN PATENT DOCUMENTS

| | | |
|---|---|---|
| 260949A3 | 3/1988 | European Pat. Off. . |
| 260948A3 | 9/1989 | European Pat. Off. . |
| 3-286827 | 12/1991 | Japan .................. 425/141 |
| 4-28524 | 1/1992 | Japan .................. 425/141 |

*Primary Examiner*—Allan R. Kuhns
*Attorney, Agent, or Firm*—Inger H. Eckert; Anthony R. Chi

[57] ABSTRACT

An extrusion system utilizes single or tandem extruders and a mixer-cooler to extrude a foamable extrudate through a die in a sealable chamber. The foamable extrudate is shaped and calibrated within the chamber. The die is mounted on the end of a gel tube projecting through a gland seal in a fixed bulkhead forming the upstream end of the chamber. The gel tube and mixer-cooler are mounted on a movable carriage, movement of which may be used to adjust the die with respect to shaping and calibrating equipment inside the chamber. The mixer-cooler achieves a selected narrow range of uniform viscosity of the melt at the die depending on the size of the product and density. The chamber is preferably a vacuum chamber producing low density foams. The product exits the chamber to atmosphere on a continuous basis through a submerged orifice in a water baffle immersion seal. The mixer-cooler enables a large size low density product to be produced with uniform cellular structure without cell collapse or density gradients, as the product is subjected to the pressure and temperature transformations passing from the chamber to atmosphere through the water. The seal includes the submerged orifice with a free wheeling guiding system upstream of the orifice. Immediately ahead of the guiding system, the parameters of the foam extrudate are sensed to control the configuration of the orifice on a continuous basis. Before the extrudate passes into the water baffle seal it moves over a floating dancer roll, the position of which controls a haul-off such as a vacuum belt at the tail end of the system. This avoids pushing on the extrudate.

25 Claims, 8 Drawing Sheets

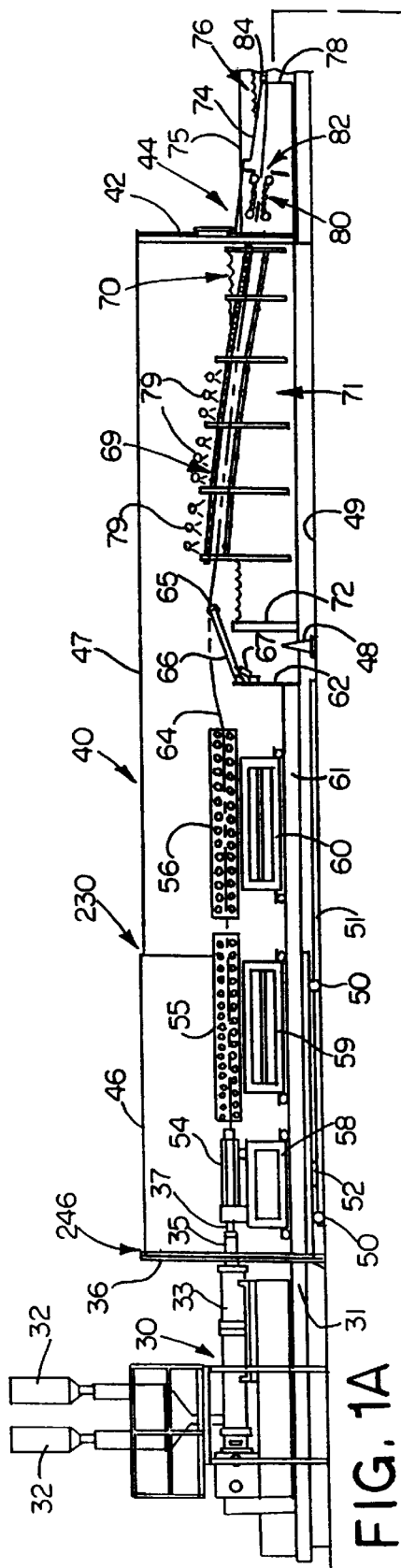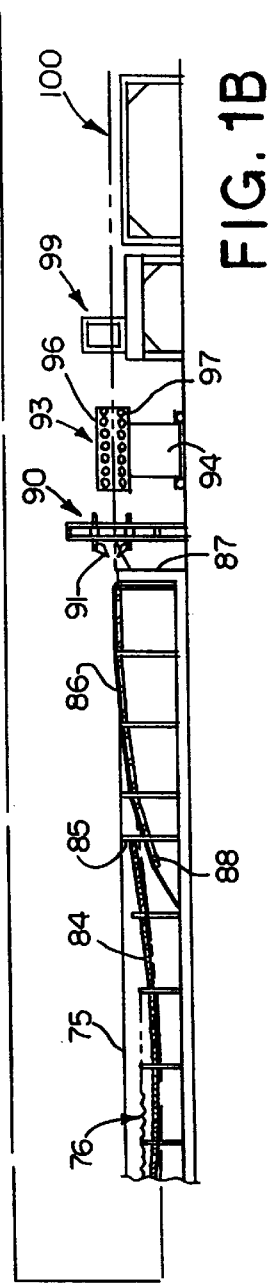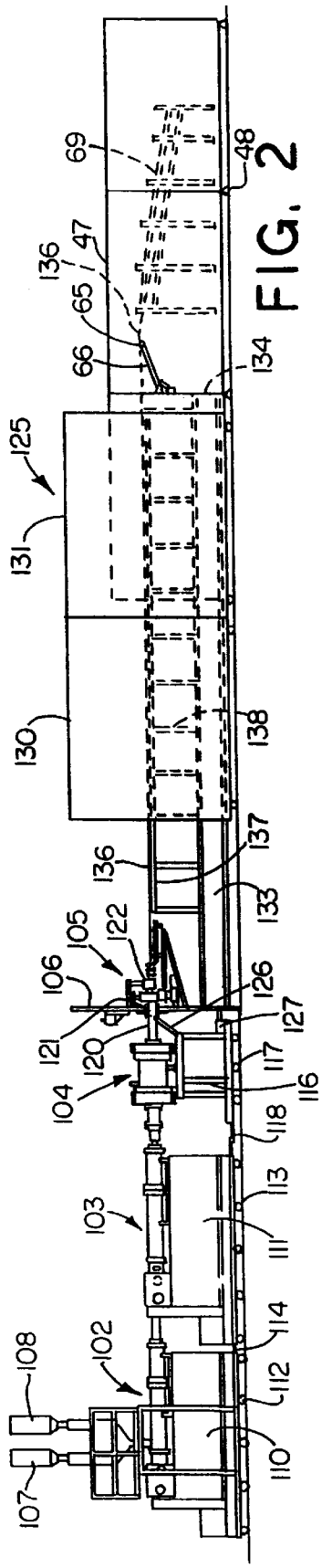

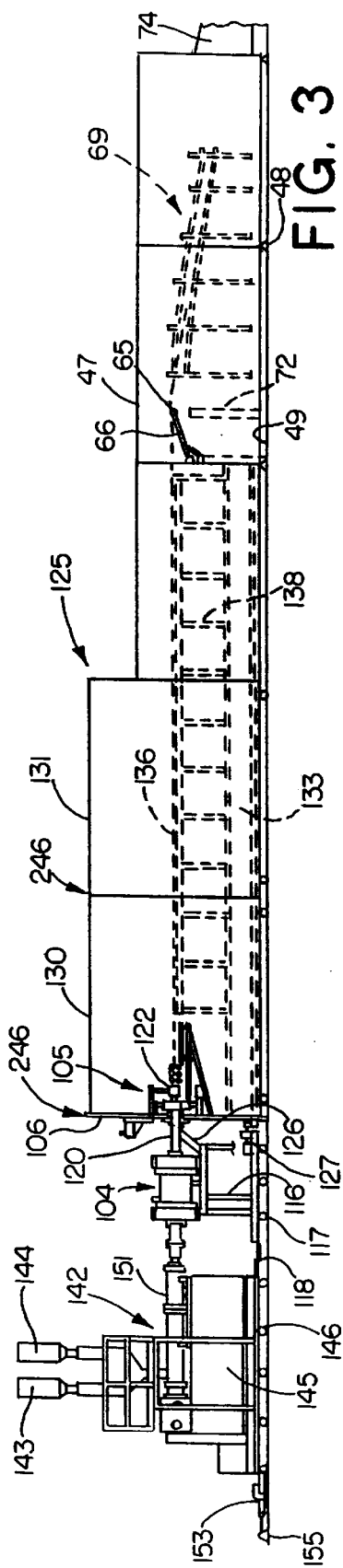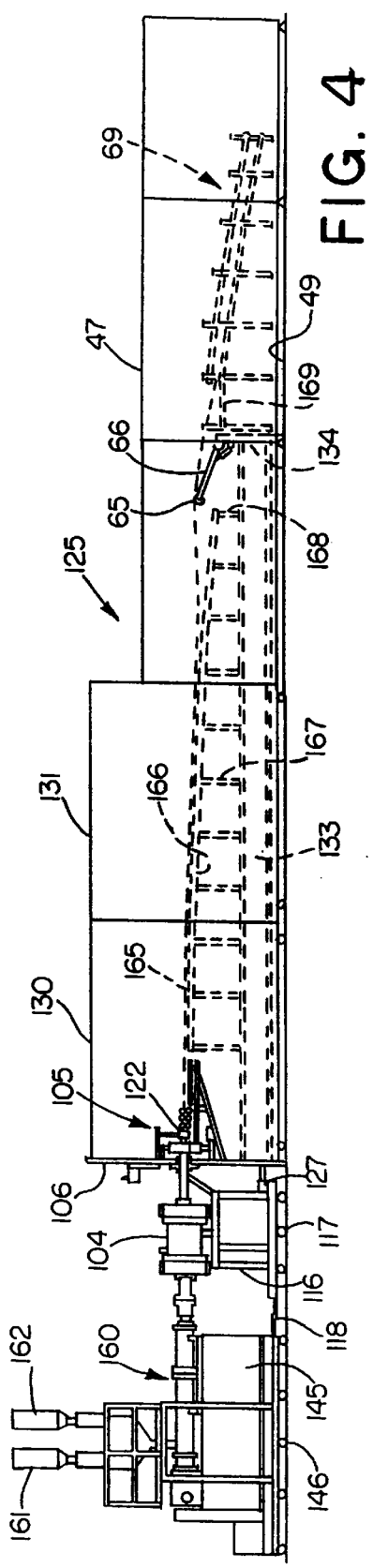

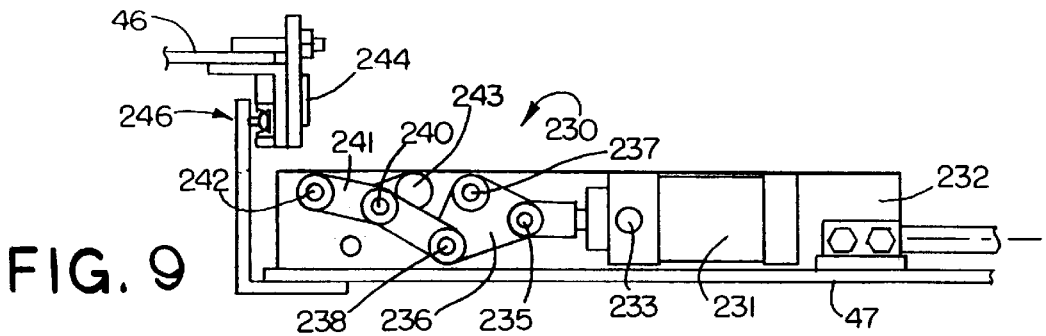
FIG. 9
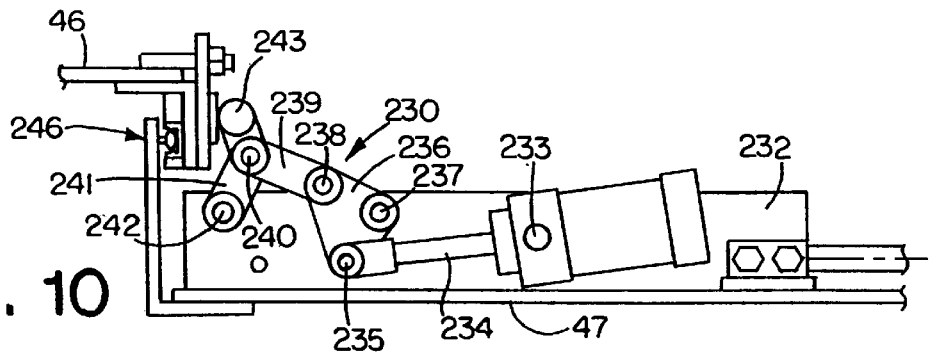
FIG. 10
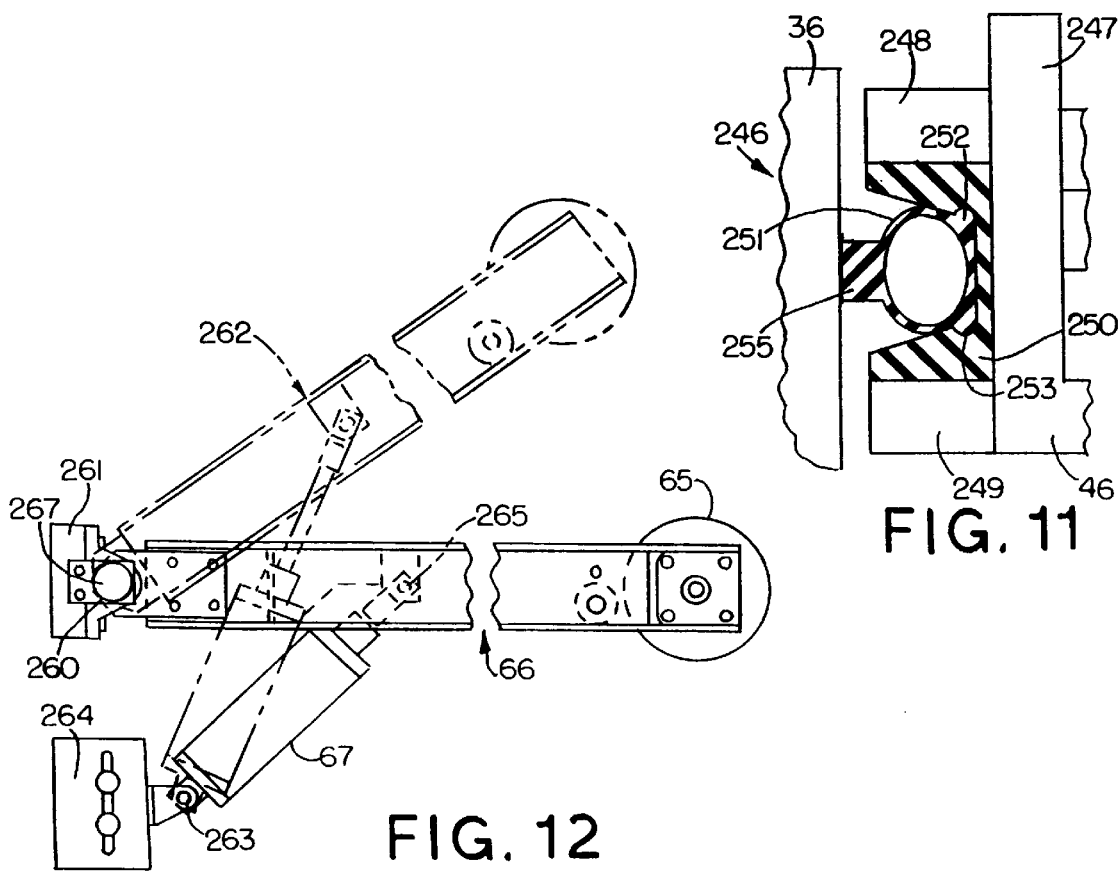
FIG. 11
FIG. 12

SEALABLE CHAMBER EXTRUSION APPARATUS WITH SEAL CONTROLS

RELATED APPLICATIONS

This application is a continuation-in-part of the following applications: Ser. No. 08/696,472, filed Aug. 14, 1996, now U.S. Pat. No. 5,753,161, for VACUUM EXTRUSION SYSTEM AND METHOD; Ser. No. 08/696,718, filed Aug. 14, 1996, now U.S. Pat. No. 5,783,122, for VACUUM EXTRUSION APPARATUS AND METHOD; and Ser. No. 08/916,185 filed Aug. 21, 1997, now pending, for VACUUM EXTRUSION SYSTEM AND METHOD.

DISCLOSURE

This invention relates generally to a sealable chamber extrusion apparatus and method with seal controls, and more particularly to an apparatus and method for forming high quality low density foam board at economical throughputs.

BACKGROUND OF THE INVENTION

Vacuum extrusion of high quality, low density polystyrene foam board sold under the well known color PINK® and FOAMULAR® trademarks by Owens Corning of Toledo, Ohio, USA, has been accomplished in inclined barometric leg vacuum extrusion lines. In such systems, the vacuum chamber is somewhat inclined. The die is positioned at the upper end along with shaping or calibration equipment. At the lower end, the chamber is closed by a hood extension and immersed in a pond of water. The pond seals the lower end of the chamber and provides an immersion cooling bath for the extrudate as it leaves the vacuum chamber. The buoyant extrudate may be supported beneath a continuously moving belt which moves through the pond through a large radius of curvature. When the extrudate surfaces to atmosphere, it is cut and processed further. Such installations are costly and present many operating problems, particularly since the upper end of the chamber may be a number of meters above and a substantial distance from the lower end. Anything dropped at the upper end of the inclined chamber where all of the relatively complex shaping and calibrating equipment is located may literally have to be fished out of the lower pond many meters away.

In U.S. Pat. No. 4,783,291, a horizontal vacuum chamber system is employed which seals the exit end of the chamber with a water baffle seal. The extrudate exits through an underwater orifice which connects the vacuum section and atmospheric section of an immersion cooling pond. The extrudate is conveyed through the orifice by a curved belt conveyor, and the top of the orifice has a movable shutter which restricts the orifice in response to vacuum level. The shutter acts as a gross flow control valve for water moving from the lower level atmospheric section of the pond to the higher level vacuum section of the pond. During vacuum operation, the level of the pond inside the chamber is maintained by circulating excess water back to the atmospheric section.

For sizable or complex extrudates, relatively complex power driven and adjustable equipment is required downstream of the die. For a fan shape die, where the die lips are curved, the equipment may literally surround the die. Typical of such equipment is an apparatus known as a "slinky" which includes upper and lower sets or assemblies of power driven disks which are mounted for rotation on arcuate or curved axles which extend at different radii from essentially the same center as the curvature of the fan shape of the die lips. All of such shaping and calibration equipment is complex and requires access and servicing, particularly during start up.

A foaming, moving, hot extrudate under vacuum is an amorphous object and does not become substantially fixed until it passes through the cooling immersion pond of the water baffle seal to atmosphere. If the shaping or calibration machinery is not functioning properly, the amorphous extrudate may become deviant, expanding or diverting from the machine line. When this happens, more often during startup, the problem needs to be corrected promptly to avoid shutting down the line. If the line is shut down for any significant length of time, equipment may have to be removed and replaced or throughly cleaned before the line can be restarted. Downtime versus operating time, and rate is the economic measure of any production facility. It is accordingly important that the equipment be quickly accessible, and that the extrudate be drawn through the system without being pushed or shoved with inconsistent or excessive force. It is also important that the underwater exit orifice closely match the size of the extrudate which may vary in width and thickness. Too large an opening creates inefficiencies, while too small an opening can create hangups, deviations, pull-aparts, and other problems.

In the extrusion production of foam boards, such as the noted insulation boards, the size and thickness may be substantial, such as 10 to 12 centimeters (3.94 inches to 4.72 inches) in thickness and up to a meter or more wide. Such board may have a cross-sectional area of in excess of about 1000 $cm^2$ (155 $in^2$). To make such board in economic quantities, such as more than 450 kg/hour (1000.0 lb/hour) to about 1360 kg/hour (3000.0 lb/hour) or more, the system must have substantial throughput and achieve a uniformity of the melt. To achieve proper uniform cell size and structure for low density, large size product such as those having a cross sectional area of at least 80 $cm^2$ (12.4 $in^2$) and preferably from about 200 $cm^2$ (31 $in^2$) to about 1000 $cm^2$ (155 $in^2$) or more, the proper uniform melt must be formed.

The melt is formed from pellets and reclaim scrap and other additives by the extruder under heat and high pressure. The other additives may include fire retardant and UV inhibitors, for example. A blowing agent is also added which does not expand in the melt under pressure, but does so as the melt exits the die into the vacuum chamber. The vacuum increases the pressure difference, promotes the expansion and enables the production of low density foam.

As is known, the melt has to achieve certain elevated temperatures for thorough mixing and formation of the melt, but to achieve uniform quality foam product, particularly in a low density vacuum foam system, a critical uniform viscosity range must be achieved. The particular viscosity range is dependent on product size and density. A higher viscosity is required for larger size product. If the product is not viscose enough or too fluid, the cells will rupture or collapse during foaming. If the melt is too viscous, homogeneous cell grown is difficult to impossible. Although cells may collapse in atmospheric systems, in a vacuum foam system, problems such as cell collapse or less than prime quality product may be more pronounced. A vacuum foam system is different from normal atomospheric foam systems. Not only is there an increased pressure drop at the die lips, but the reversion to atmospheric pressure, especially when emerging from an immersion seal, can result in cell collapse or non-uniformity actually distorting or shrinking the product, resulting in irregularities or density gradients, and less than quality product. In vacuum foaming, not only must the proper viscosity be achieved, it must be maintained uniform throughout the melt. Viscosity is controlled in part by controlling the temperature of the melt.

The problem with many heat exchangers employed for such purposes is several fold. One set of problems is complexity and cost. Another set is effectiveness and efficiency. To move the polymer melt through elbows or right angle turns at high pressure and temperature, or through divergent flow paths is energy inefficient and raises the costs involved. Moreover, niches or potential dead space should be avoided or minimized. These do not contribute to homogeneity of the melt and require more frequent cleaning and downtime for such purposes. Such dead space is simply inefficient. A complex form of heat exchanger is shown, for example, in U.S. Pat. No. 4,423,767.

The flow path of the melt should be as close to or aligned with the machine axis as possible, and the heat exchanger should be as compact as possible. Any excess increase in dimension between the extruders and the die can be self defeating, since any thermal or viscosity homogeneity achieved by the heat exchanger may be lost if the melt has to travel too far. This is further complicated if the die is inside a vacuum chamber to achieve a good low density foam, and if adjustments or thermal expansion or other minor movements need to be accommodated.

While static mixers have been employed to attempt to achieve homogeneity of melts, they do not, nor have the capacity or efficiency necessary for the large throughputs noted above, and the production of quality foam products subject to the pressure changes of vacuum extrusion.

To achieve both extrusion throughput rates and product quality, it is important to have a mixer which can also precisely control the temperature and thus the viscosity of the melt and maintain the thermal homogeneity to the die. Only in this manner can the benefits of high quality low density foam formed under vacuum be achieved, reducing density gradients in the foam, which gradients may result in or from cell or board collapse particularly as the board moves from the vacuum chamber to the pressure of atmosphere. To achieve this improved product quality for a range of products which may vary in cross section (from relatively thin to thick) and vary in density, the heat exchanger must be able to control the melt temperature very precisely, and maintain homogeneity of temperature all at varying throughputs, and most difficultly at high throughputs for large extrudates.

SUMMARY OF THE INVENTION

A horizontal vacuum extrusion line includes one or more extruders which may be single screw or twin screw forming a hot plastic melt which may include a number of additives such as fire retardants, lubricants, ultraviolet (UV) inhibitors, and blowing agents. Where the product is foam board, which may be of substantial size such as 1000 cm$^2$ (15.5 in$^2$) or more, the melt has to be brought to critical range uniform viscosity before exiting the die. This is particularly true if the die is in a sealed vacuum chamber and the product is low density foam board such as the type used in insulation. To achieve this uniform viscosity, the hot melt is passed through a high capacity mixer-cooler which brings the melt temperature to a melt uniformity to achieve the desired homogeneous viscosity within a narrow range, which range is dependent on the size and density of the foam board being produced.

The hot melt exits the extruders on the machine or line axis, and the mixer-cooler is on that axis immediately downstream of the extruders. The mixer-cooler is a relatively axially short pressure vessel which has upstream and downstream tube sheets, between which extend closely spaced, relatively small mixing tubes, each of which may contain an axially continuous series of deflecting blades thoroughly to rotate and mix the melt, as individual static mixers. Connected to each tube sheet are heads which have large flaring conical chambers overlying the inlet and outlet ends of the large number or bundle of smaller mixing tubes. The heads provide an expanding and contracting flow path, without elbows, notches, niches or corners creating significant dead spaces which would adversely affect the melt. The inlet head has an inlet on the machine axis which is axially aligned with the outlet in the opposite or downstream head. The outlet is slightly smaller than the inlet, creating a back pressure. Connections to the inlet and outlet may be made by standard ANSI high pressure flange connections. The bundle of mixing tubes is substantially symmetrical to the machine axis, and each tube is parallel to that axis. The overall diameter of the unit is only slightly less than the axial length. The unit is quite compact and can readily be inserted in and removed from the line.

The large number of tubes in the bundle, which may range from about 50 to about 300, depending on throughput required, substantially increases the cross sectional area of the melt flow path, which slows down the flow of the melt through the mixing tube bundle. The ratio is well more than two to one, and for large volumes the ratio may be in excess of twenty to one, even when considering only the larger diameter inlet.

The melt passing through the individual mixing tubes is moving substantially slower than the melt entering or leaving the mixer-cooler. A cooling medium is circulated through the shell of the pressure vessel. Each tube is fully immersed in the circulating medium. A series of baffles are provided within the shell so that the coolant flow passes over the majority of the tubes several times before leaving the vessel shell. The coolant in substantial volume moves through a heat exchanger extracting heat. The amount of heat extracted is closely controlled, and in this manner the temperature of the melt moving through the mixer-cooler can be set within a range of about 1° F. (about 0.5° C.).

The mixer-cooler is connected to the extruder output by a short gel tube and to the die by a somewhat smaller yet longer gel tube. The longer gel tube from the mixer-cooler to the die preferably incorporates a static mixer breaking up any residual insulating film layer resulting from laminar fluid flow and maintaining the homogeneity of the melt. The upstream gel tube may also incorporate the blades and fins of a static mixer. The upstream gel tube may, however, be illuminated depending on the system throughput rate.

The die is positioned inside a sealable vacuum chamber, and the longer smaller gel tubes extends from atmosphere into the vacuum chamber through a fixed bulkhead of substantial size or diameter. The die is positioned substantially near or on the center of the bulkhead and supported by a movable carriage outside the bulkhead.

The die, gel tube, and cooler-mixer are mounted on such die carriage, and the extruder or extruders are also on a separate carriage supported for movement axially of the line, both for intentional adjustments or replacements, and for movements resulting from thermal or pressure expansions and contractions. The carriages are linked or coupled. A hydraulic actuator or traverse assembly is provided between the extruder carriage and the floor. This actuator is relatively small in diameter yet provides a substantial travel such as on the order of about 370 cm (145.67 in) to 450 cm (177.17 in).

To move the die axially for adjustment within the vacuum chamber with respect to shaping or calibrating mechanisms, for example, a larger yet shorter actuator is provided between the die carriage supporting the mixer-cooler, gel tube and die, and the fixed bulkhead. This larger yet shorter hydraulic cylinder may have a movement of about 5 cm (1.97 in). Both cylinder actuators may include a valve having a neutral position permitting yet restricting very slight movements such as those encountered with thermal or pressure expansions.

The mixer-cooler, even though having significant throughput capacity, is so compact that it is supported a substantial distance off the floor, although this is in part may be due to the size of the fixed bulkhead, which may be several meters in diameter. The traveling die carriage for the mixer-cooler supports in cantilever fashion the downstream gel tube and die, all for axial movement on the machine or line axis.

Where the shaping mechanism is fixed with respect to the machine axis, such as the noted "slinky", die-shaping mechanism, adjustment may then be obtained by axial movement of the die. If the die is adjustably attached to a shaping mechanism such as shown in copending application Ser. No. 08/696,718, filed Aug. 14, 1996, and entitled "Vacuum Extrusion Apparatus and Method", then the axial movement of the die is primarily for adjustment of the combination, or for heat or pressure caused movements.

The sealable vacuum chamber includes one or more large movable sections which surround a beam or truss extending between the fixed bulkhead through which the die extends and a downstream bulkhead. The shaping and calibrating equipment may be mounted on this beam or truss for movement axially of the line. The movable sections permit quick access to this equipment with adequate space or environment, which is especially important on start up. The telescoping sections quickly seal against the fixed upstream bulkhead and each other or fixed sections by inflatable seals and quick acting toggle clamps.

The shaping and calibrating equipment controls the shaping and expansion of the foaming extrudate and may be of substantial length. After the extrudate leaves such equipment and has been subject to sufficient expansion under vacuum, it passes over a dam, the edge of which is just below the machine axis, and the foaming extrudate is deflected downwardly into an immersion pond of water. The pond has an interior section and an atmospheric section and acts as a water baffle seal to permit the foamed extrudate to exit the vacuum chamber on a continuous basis. Just before the extrudate is deflected downwardly, it passes over a dancer roll which literally lifts the extrudate from adjacent supports, but not far enough to make difficult or excessive the downward deflection of the extrudate into the pond.

The dancer roll is fairly large and extends completely across the underside of the extrudate. It is supported on an arm frame, pivoted and offset beneath the extrudate either upstream or downstream of the roll. The arm frame pivot may be provided on a bulkhead or internal frame portion of the chamber on the upstream side of the dam, or the dam itself. An encoder in the pivot measures the angle position of the arm frame and thus the roll. The arm frame is supported by a low pressure pneumatic piston-cylinder assembly so that the dancer roll floats against the bottom of the extrudate. The encoder is, of course, a measure of the position of the arm and roll, and this is a measure of the extrudate deflection at a given upward pressure. This is in turn an analog control of the tension on the extrudate within the chamber between the steps of shaping and calibrating upstream, and a tractor device downstream.

The indirectly measured tension is used to control the tractive effort of a haul-off which is at the tail end of the line some distance away. A preferred tractor device is a vacuum belt haul-off. It is believed apparent that too much tension on the extrudate would tend to pull it apart in or just downstream of the shaping and calibrating equipment. Too little tension may cause the extrudate to push itself causing deviations or deflections and adversely affecting the natural growth of the product and a uniform cellular structure. Either case can bring the line to a halt, requiring the opening of the chamber, making required corrections or adjustments, and rethreading or restarting the system.

Another reason for maintaining the proper tension on the extrudate is the under water hole or orifice through which the extrudate moves to pass through the water baffle seal from the vacuum chamber section of the immersion pond to the lower level atmospheric section of the pond. Since the chamber under vacuum will draw water from the atmospheric section into the vacuum chamber only to be forcibly ejected by a circulation pump, the clearance between the extrudate and edges of the orifice should be close and uniform. Otherwise energy inefficiency, control surges, and attendant control problems result. If the clearance is too close, the extrudate may hang up or deviate from its intended path. Complicating the problem is that the extrudate is continuing to grow. Although the extrudate has achieved its primary "board" shape, it may still be growing somewhat axially, in width, and in thickness.

To facilitate the movement of the extrudate through the orifice, a guide system is provided immediately upstream of the orifice. The guide system is provided in a projecting hood with the orifice being provided at a lower shallower portion.

The guide system at the orifice includes upper and lower close-pack guide roller sets. Each set includes a larger diameter powered end rolls, with a series of closely packed smaller idler rolls tangent to a tangent line connecting the interior of the two larger end rolls. The larger rolls are powered only for start-up or threading, and all rolls free wheel or idle when the system is in operation and operating continuously. The larger rolls may have a urethane or rubber type coating.

Since the foaming board will float, the upper guide roll set is aimed at the fixed upper horizontal edge of the orifice. The lower roll set is movable toward and away from the upper roll set, and a bottom shutter or gate for the orifice is mounted on the downstream end of the lower roller set. Accordingly, the lower orifice edge shutter and the bottom close-pack roll set move as a unit.

Immediately upstream of the upper roll set is a fixed platen or plate beneath which the board extrudate slides. On the lower side of the extrudate opposite the platen is a thickness sensing roll which extends between the distal end of a pair of arms of a pivoting arm frame. The platen is a reference plane or back stop for the underslung thickness measuring roll, the roll being held against the bottom of the board extrudate by a low pressure pneumatic cylinder or actuator assembly. The thickness or (y) dimension measuring roller extends transversely beneath the product underwater while the arm frame pivot is above the water. A rotary encoder in the pivot senses the position of the roller and is an analog measurement of the thickness of the product. The generated signal operates a PID (Proportional Integral Derivative) motion controller which may include an adjustable compensating factor for known growth rate of the product in the (y) dimension. The PID controller operates a motor above the water level which vertically moves or controls the position not only of the bottom shutter, but also the bottom set of close-pack guide rollers always aligned with the upper edge of the shutter.

The width or (x) dimension is sensed by two edge rollers having vertical rolling axes mounted on the distal ends of swing arms each proximally pivoted on vertical axes on a bulkhead above the water level. Respective pneumatic cylinder assemblies urge the respective edge rollers into engagement with the respective edge of the extrudate. A rotary encoder in each arm pivot senses the position of the roller sensing the position of the edge of the product. This becomes a measure of the width or (x) dimension of the product. The information is passed to respective PID motion controllers operating respective lateral or edge gates for the orifice.

Each edge gate, while having a vertical inner edge, is mounted on inclined parallel tracks. The inclination may be about 30° to about 45°, and the gate has the angled configuration to fit. This then positions the operating drive for the gates in an elevated position out of the water. Each gate may be actuated by a motor on an inclined bracket extending from the hood. A rotary screw drive, for example, reciprocates a rod connected to the submerged gate, the rod extending parallel to the tracks. The edge rollers may also sense through a summing calculation the centerline of the product. If the centerline is out of tolerance, corrective action can be taken, but it does not normally affect the operation of the control of the orifice on a continuous basis.

After the extrudate passes through the orifice, it enters the lower level atmospheric section of the pond, still fully immersed or submerged. The lower level pond may extend for some length axially of the line. The foam product is held submerged by a series of idler rollers above the product arranged on a large radius arc with the center of curvature well above the product. The buoyancy deflects the product upwardly out of the water in a controlled gradual fashion, where it is supported on top of idler rollers. The product moves through a blow-off where excess moisture is removed much like a car wash. The product at the tail end of the line passes through a vacuum table or pull stand tractor haul-off which grips and pulls the extrudate. Beyond the pull stand the extrudate or board may be trimmed, cut to length, or otherwise treated.

The pull stand is preferably a vacuum table or tractor which has a power driven foraminous or open belt which moves across a vacuum chamber. The vacuum holds the extrudate to the belt, and the belt linear speed is powered by a motor drive and controlled by the angular position of the dancer roll and a dancer roll controller. The vacuum level in the table or pull stand may be controlled to achieve the proper vacuum or grip, while the degree of pull is controlled by the dancer roll and controller.

In this manner, the foaming extrudate is not pushed or shoved during continuous operation at any point between the shaping and calibrating equipment within the vacuum chamber, and the pull stand at the tail end in atmosphere. In this manner, high quality foam products of a variety of sizes can be made economically and efficiently.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE ANNEXED DRAWINGS

FIGS. 1A and 1B are broken continuations of each other showing schematically in side elevation a vacuum extrusion line in accordance with the present invention;

FIG. 2 is a somewhat enlarged similar elevation of vacuum chamber system shown open using a primary and secondary extruder with another type of shaping mechanism;

FIG. 3 is a similar view with a single extruder and with the chamber shown closed;

FIG. 4 is a similar view but with a modified conveyor and dancer roll entry into the water baffle seal;

FIG. 9 is a fragmentary radial elevation showing a chamber locking mechanism in an open position;

FIG. 10 is a similar view showing the chamber toggle locked closed;

FIG. 11 is an enlarged section of the annular seals which seal the chamber when locked closed;

FIG. 12 is an enlarged fragmentary view of the dancer roll assembly used to control tractive or pulling force on the extrudate;

DETAILED DESCRIPTION OF THE ILLUSTRATED PREFERRED EMBODIMENTS

Figure 6:
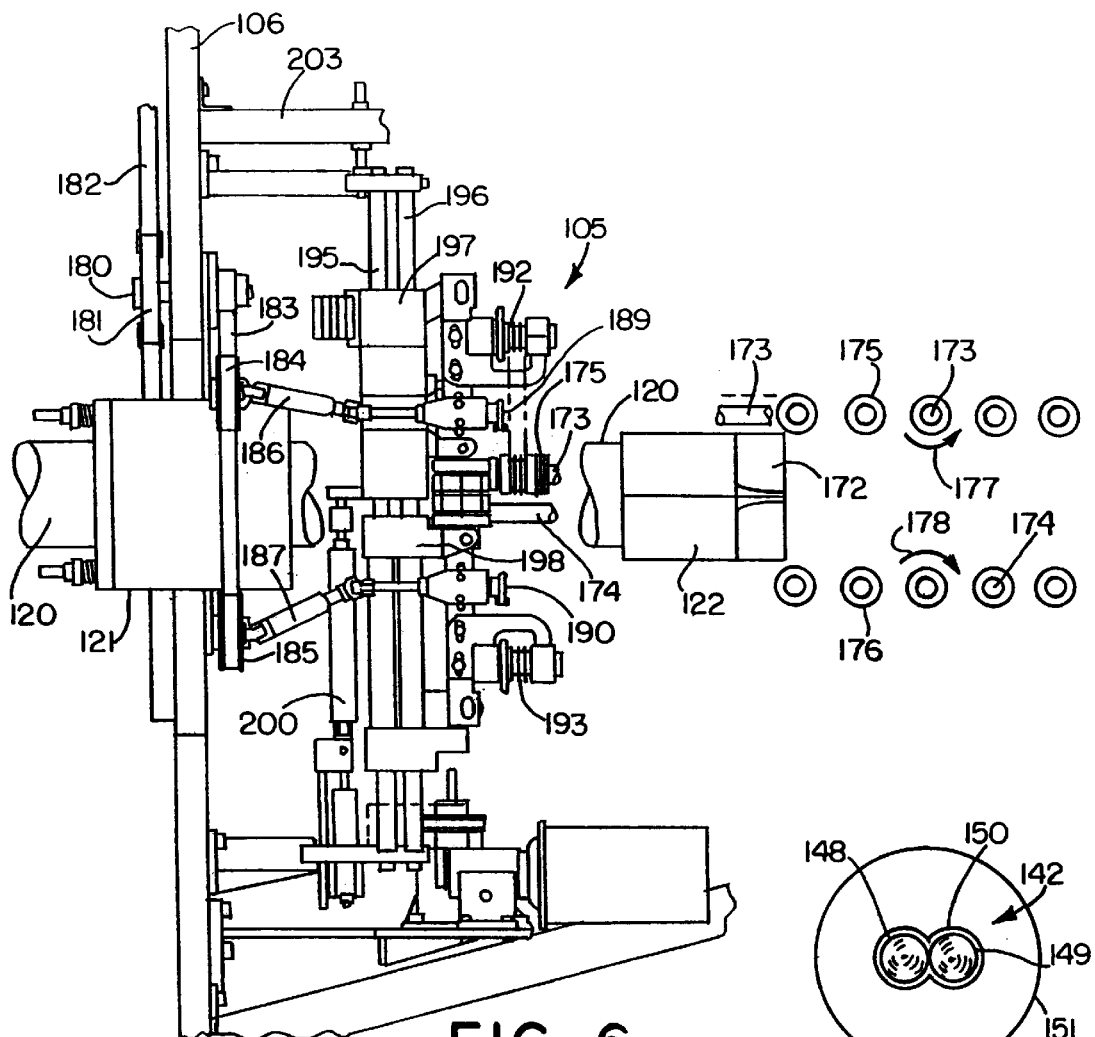
FIG. 6 is an enlarged fragmentary view of a "slinky" shaping mechanism and its positioned with respect to the fixed bulkhead and the die.

Referring now to the drawings and more particularly to FIGS. 1A and 1B, it will be seen that the extrusion line or system starts at the upstream end with an extruder 30. The extruder is mounted on stand 31 and includes hoppers 32 by which raw materials are fed to the extruder barrel 33 to be formed under heat and pressure into a foamable polymer melt.

An extension of the extruder indicated at 35 projects through a large diameter fixed bulkhead seen at 36. A die 37 is mounted on the end of the extruder extension within a chamber shown generally at 40. The fixed bulkhead 36 forms the upstream or entry end of the chamber 40. The downstream end is formed by a fixed bulkhead 42 and a water baffle seal is shown generally at 44. The seal permits the product to exit the chamber on a continuous basis.

In FIG. 1A, the chamber includes a movable section 46 which may telescope over the upstream end of fixed section 47. The fixed section is mounted on stanchions 48 on the floor 49, while the movable section is mounted on rollers 50 on rails 51. The movable section may be powered by a motor shown schematically at 52, much like a garage door.

Within the upstream end of the vacuum chamber is shaping and calibration equipment which may comprise a shaper 54 and calibration equipment as seen at 55 and 56. The particular equipment illustrated in FIG. 1A may be of the type manufactured by LMP IMPIANTI of Turino, Italy. The extrudate is plasticised in the extruder 33 from recycled and virgin material to which additives such as fire retardants, ultraviolet stabilizers, and blowing agents are added. This is formed into the melt which is then extruded through the shaper 54 forming it into a generally flat plate or board shape. As the extrudate continues to foam and passes through the equipment 55 and 56, it is calibrated in thickness and flatness. When the chamber is closed and sealed, the expansion and shaping of the extrudate when forming low density material is accomplished under vacuum to obtain a low density foam product.

It is noted that the shaper and calibration equipment are each mounted on respective carriages seen at 58, 59 and 60, which are mounted for movement axially of the line or parallel to the machine direction on a truss 61. The truss 61 extends from the fixed upstream bulkhead 36 and an interior support 62.

The foaming extrudate shown generally at 64 passes from the die through the shaping and calibration equipment and then passes over a dancer roll 65 mounted on a pivoting arm assembly 66 pivoted on the support 62. The arm assembly 66 is urged upwardly by a pneumatic cylinder assembly 67 causing the roller to lift and deflect upwardly the extrudate to some extent. The pressure in the pneumatic cylinder assembly is controlled to cause the roller to float or dance beneath the extrudate. The position of the dancer roll controls the tractor haul-off as hereinafter described.

After the extrudate passes over the dancer roll 65, it is deflected downwardly by a roller conveyor system 69. The conveyor system may have a number of more closely spaced rollers on top and relatively more widely spaced rollers beneath the extrudate. The rollers are positioned and mounted so that the extrudate is deflected downwardly into the upper level section 70 of a pond of water 71 which is contained in the downstream end of the vacuum chamber by a dam 72. The gradual curvature of the conveyor system 69 causes the extrudate to become fully immersed in the pond 71.

The extrudate 64 moves through a window in the bulkhead 42 and into a hood 74 which projects into an elongated containment 75 for the atmospheric lower level portion 76 of the pond 71. The end of the hood indicated at 78 is well below the atmospheric level section 76 of the pond 71.

Positioned above the pond section 70 are spray nozzles 79 which are connected to the atmospheric section 76 of the pond. When the chamber is evacuated, water will be drawn into the chamber spraying the extrudate before it submerges into the pond section 70 to facilitate cooling.

From the conveyor section 69, the extrudate passes through a guide roller assembly shown generally at 80, directed toward a generally rectangular window or orifice 82 which is the demarcation between the vacuum upper level pond section 70 and the atmospheric lower level pond section 76. Under vacuum, water will tend to flow from the atmospheric section to the upper level vacuum section, and the level of the vacuum section may be controlled by the recirculating pump as described, for example, in the noted prior application of Roger Lightle et al., Ser. No. 08/696, 472, filed Aug. 14, 1996, and entitled "Vacuum Extrusion System and Method".

It will be appreciated that if the chamber is used as a pressure chamber, the pond levels will be reversed, and the circulation to maintain the seal or orifice 82 submerged will be in the opposite direction.

When the extrudate exits the lower downstream end of the hood at 78, it is kept from floating to the surface by a conveyor system 84, seen primarily in FIG. 1B, which is positioned above the extrudate. The conveyor system may be a series of relatively closely spaced transverse idler rollers which simply keep the moving continuous extrudate submerged. The conveyor is formed in a relatively large radius arc which maintains the extrudate under water for a substantial distance and time in the atmospheric portion 76 of the pond.

As the extrudate approaches the level 76, the conveyor system 84 terminates as seen at 85, and a second curved conveyor system 86 supports the underside of the extrudate to lift it above the end wall 87 of the containment 75 and out of the water. The entrance of the conveyor 86 indicated at 88 is flared or spaced from the tail 85 of the conveyor 84 so that the extrudate will move freely from beneath one to the top of the other.

After the extrudate clears the containment wall 87, it passes through a blow-off indicated at 90. Jets of air passing through nozzles 91 simply remove excess moisture from the extrudate much as the equipment commonly used in car washes. From the blow-off, the extrudate passes into a tractor haul-off 93. The tractor haul-off 93 is mounted on a stand 94 and may comprise a plurality of power driven upper and lower rollers 96 and 97 which grip and pull the extrudate from the calibration equipment seen in FIG. 1A over the top of the dancer roller 65 and through the water baffle seal to atmosphere. During continuous operation, there is no pulling or pushing on the extrudate from the calibration equipment to the tractor haul-off. The large number of rollers may be coated with a rubber material such as urethane, and the squeezing pressure on the extrudate is minimized. As hereinafter described, the position of the dancer roll may be employed to control the pull of the tractor haul-off and thus the tension on the foaming extrudate from the calibration equipment through the water baffle seal.

After exiting the haul-off, the extrudate passes through a cutoff and trimming unit indicated at 99. The unit 99 may cut the extrudate to length and also trim or treat the lateral edges. Any scrap produced by the operation is treated and recycled.

After passing through the cutting and trimming operation 99, the extrudate is in the form of sizable panels or boards which may then may be stacked and packaged for shipment, or be further processed to form lamination or sandwich panels, for example. The stacks may be formed at the final station 100 for such packaging or further treatment. After exiting the containment 75, the extrudate is processed at table height, which is the approximate height of the containment 75 for the atmospheric portion of the pond. For this reason, the cutoff and trim station as well as the stacking station are supported on stands at such table height.

Referring now to FIGS. 2, 3 and 4, it will be seen that the configuration and equipment employed in the vacuum system may be modified in a number of ways designed to enhance the quality of the product while achieving large throughputs and extrudates of substantial size.

Referring initially to FIG. 2, there is illustrated a system which employs tandem extruders shown generally at 102 and 103. Connected to the polymer melt output of the secondary extruder 103 is a mixer-cooler 104 and a "slinky" shaping mechanism 105 mounted on the inside of a large fixed bulkhead 106. The raw materials are fed through the hoppers 107 and 108 to the primary extruder 102. The output of the primary extruder may pass directly or through a gear pump to the secondary extruder 103. Both the primary and secondary extruders are mounted on stands seen at 110 and 111, respectively, in turn mounted on rollers 112 and 113, respectively, and connected or coupled at 114. The mixer-cooler 104 is also mounted on a stand seen at 116 which includes roller supports 117. The stand 116 is connected to the stand 111 at the coupling 118.

Also supported by the stand 116 is a gel tube 120 which extends through a gland seal shown in more detail at 121 in FIG. 6 in the fixed bulkhead 106. The extrusion die 122 is on the end thereof within the vacuum chamber which is shown generally at 125. The vacuum chamber is, however, shown open in FIG. 2.

The gel tube projecting from the mixer-cooler 104 to the die 122 is supported on the carriage 116 by an angular strut 126. Movement of the die with respect to the fixed bulkhead 106 is obtained by a piston-cylinder assembly or actuator 127 connected between the carriage 116 and the fixed bulkhead. In this manner, the die 122 may be adjusted axially of the line with respect to the axially fixed "slinky" shaping mechanism 105.

The vacuum chamber 125 of FIG. 2 may include a fixed section 47 like that of FIG. 1A, but includes two substantially larger movable sections seen at 130 and 131. The larger sections are substantially larger than the fixed section 47, as is the fixed upstream bulkhead 106. The vacuum chamber includes a truss or beam 133 which extends between the larger upstream fixed bulkhead 106 and a downstream bulkhead 134 within the fixed section 47 of the vacuum chamber. After the extrudate indicated at 136 leaves the shaping mechanism 105, it proceeds on top of a conveyor table 137 supported on top of the truss or beam 133 by frame 138. Positioned along the conveyor table may be additional measuring and/or calibrating equipment such as those which may be employed for forming or texturing the major surface skins. In any event, after leaving the shaping mechanism, the foaming extrudate will continue to grow and may continue to do so under the beneficial influence of the vacuum within the chamber, when closed. After the extrudate leaves the table 137, it moves over the top of dancer roll 65 and enters the conveyor system 69 to be downwardly deflected into the water baffle seal through which the extrudate exits to atmosphere. The immersion cooling pond at the exit end of the vacuum chamber substantially concludes the growing or forming process of the large cross section area extrudate or board. The tandem extruder arrangement of FIG. 2, together with the mixer-cooler 104 and the large volume vacuum chamber, enable the production of high quality uniform foam boards having substantial cross sectional areas. For example, the extrusion system of FIG. 2 will produce high quality foam extrudate of about 1000 $cm^2$ (155 $in^2$) or larger and at throughputs of in excess of about 1000–1400 kg/hour (2000–3000 lb/hour).

FIG. 3 represents a system like FIG. 2 but showing only a single twin screw extruder indicated at 142. The raw materials are fed to the twin screw extruder through the hoppers indicated at 143 and 144. The extruder is mounted on a stand 145 in turn mounted on guided rollers 146.

Figure 5:
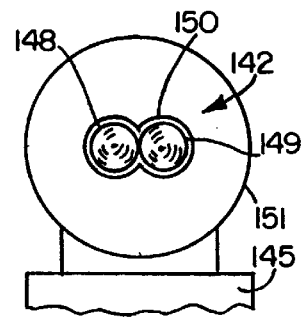
FIG. 5 is a transverse view of a twin screw extruder which may be used with the present invention.

A transaxial view of the extruder is seen in FIG. 5 where the twin meshing screws are indicated at 148 and 149. The meshing twin screws run in a figure eight barrel seen at 150 surrounded by suitable heating jackets 151. The twin screw extruder may be of the type manufactured by the noted LMP IMPIANTI of Turino, Italy.

It is noted that the stand 145 is connected to the stand 116 by the coupling 118 which may be the same as that shown in FIG. 2. The extruder 142 is movable through a substantial distance by the actuator seen at 153 in FIG. 3. The actuator is mounted on a bracket 154 projecting from the stand 145 and is anchored to the floor 49 at 155. The actuator 153, described in more detail subsequently, enables a substantial amount of movement of the extruder for placement in the line or removal from the line, and also enables the line quickly to be opened for removal or replacement of the mixer-cooler, or for a adjustment or die change. The details of the actuator are shown and described in connection with FIG. 7.

In comparing FIGS. 2 and 3, it will be seen that the two large diameter sections 130 and 131 of the chamber 125 have been moved to the closed position and locked and sealed as hereinafter described. In FIG. 3, the "slinky" shaping mechanism 105 and the internal conveyor system is the same as that seen in FIG. 2.

In FIG. 4, there is employed a large capacity single screw extruder 160 mounted on stand 145 supported on guide rollers 146. The stand 145 is connected to the die supporting stand 116 through the coupling 118. The actuator 153 may be employed with the single screw extruder 160, the twin screw extruder 142, or the tandem extruders 102 and 103 of FIG. 2. The raw materials and reclaim scrap are fed to the extruder through the hoppers 161 and 162, and the high temperature melt is fed through the mixer-cooler 104 and the die 122 which is surrounded by the shaping mechanism 105. The telescoping vacuum chamber enlarged sections 130 and 131 are shown closed, locked and sealed in FIG. 4.

After the extrudate 165 leaves the shaping mechanism 105, it passes onto the conveyor table 166 supported on stand 167 on top of the beam or truss 133. However, unlike the conveyor system of FIG. 3, the conveyor table 166 ramps downwardly slightly to its downstream end 168 which terminates short of the bulkhead 134. The dancer roll 65 and the arm assembly supporting the dancer roll are on the upstream side of the bulkhead 134, and the dancer roll literally lifts the extrudate off the lower end 168 of the ramped conveyor table 166. The bulkhead 134 may then serve as the dam for the water baffle seal, and the conveyor system 69 for diverting the extrudate downwardly into the vacuum chamber section of the pond may be shortened somewhat and moved upstream. This then shortens the fixed section of the vacuum chamber. The upstream end of the diverting conveyor section 69 includes a lower guide ramp indicated at 169 to facilitate the threading of the extrudate beneath the upper portion of conveyor section 69 and into the vacuum chamber section of the pond.

Referring now to FIG. 6, it will be seen that the "slinky" mechanism is mounted on the interior of the fixed bulkhead 106 to surround the die 122. The "slinky" mechanism 105 is similar to that mechanism shown in prior U.S. Pat. No. 4,234,529, but is driven from the exterior of the fixed bulkhead 106 in a manner similar to that shown in prior U.S. Pat. No. 4,469,652. The die 122 has a semi-circular or fan-shape die face 172. The shaping mechanism includes a series of equally radially spaced paired upper and lower semi-circular polished rods shown at 173 and 174 which extend around the semi-circular die face 172. Mounted on the respective polished rods or axels are a series of relatively thin wafers or rollers seen at 175 and 176 which are oppositely driven for rotation during extrusion as indicated by the arrows 177 and 178. The wafers or rollers interfit with each other so that driving one for rotation drives all.

The arcuate segmented driving rollers are paired top and bottom to be driven at the same speed and torque, but the speed and torque may vary as the extrudate moves radially of the die face. The drive for the paired upper and lower arcuate rollers comes through the bulkhead 106 as indicated by the shaft 180 on which is mounted pulley 181 driven by cog belt 182. The shaft is mounted for rotation in sealed bearings in the bulkhead. Inside the bulkhead the shaft 180 drives cog belt 183, in turn driving pulleys 184 and 185 in opposite directions. Such pulleys drive universally jointed or flexible drive shafts 186 and 187, respectively, in turn rotating drive sprockets 189 and 190, in turn driving through transmissions 192 and 193 a paired set of arcuate rollers in the opposite directions noted. A driving transmission for each paired roller set is provided so that the roller sets may be controlled as to speed and torque. While only five paired roller sets are illustrated, it will be appreciated that fewer or more may be employed depending upon the size of the foaming product.

Each roller set is mounted on a pair of vertically extending rods as indicated at 195 and 196 through brackets such as seen at 197 and 198. The brackets are supported by respective pneumatic piston-cylinder assemblies 200 for adjustment and for floating movement. Controlled air pressure compensates for the tare or dead weight of each roll set to achieve floating. A slight additional pressure is then employed to control the force exerted by the rolls on the foaming extrudate. The pressure is quite gentle but quite effective to confine the foaming extrudate radiating from the fan-shape die face into a board-shape which may be of substantial width and thickness.

The various aspects of the "slinky" shaping mechanism are supported on the interior of the bulkhead 106 by various brackets seen at 203. While the array of shaping rollers above and below the die and its axis or line have a substantial amount of vertical adjustment or movement, there is no significant adjustment of the shaping mechanism axially of the line.

Figure 8:
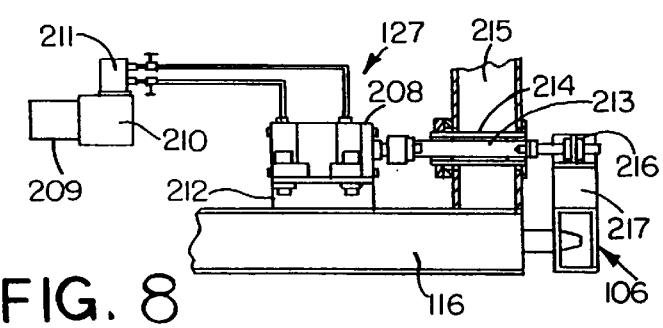
FIG. 8 is a similar view of the die adjustment mechanism extending between the die carriage and the fixed bulkhead.

In order to achieve adjustment of the die axially of the line with respect to the shaping mechanism, the mechanism 127 seen in FIG. 8 is employed to move not only the carriage 116, but the mixer-cooler 104 and the tube 120 which supports the die 122 on the end thereof inside the vacuum chamber. Such die adjustment need not be very extensive. The traveling die carriage is seen at 116 and supports a relatively short stroke hydraulic piston-cylinder assembly 208. The piston-cylinder assembly or actuator may include its own motor 209, pump 210 and operating valve 211. The cylinder of the assembly 208 is mounted on a pad 212 on the frame 116. The rod 213 projects through a bushing 214 in the carriage upright frame member 215 and is anchored at 216 to a frame portion 217 of the stationary bulkhead 106. The stroke of the actuator 208 is relatively short such as on the order of approximately 5 cm. In this manner, relative movement of the carriage with respect to the fixed bulkhead is obtained with the gel tube 120 supporting the die 122 sliding in gland seal 121 seen in FIG. 6. The gland seal may be of the type shown in the above noted co-pending application of Robert L. Sadinski, Ser. No. 08/696,718, filed Aug. 14, 1996, for VACUUM EXTRUSION APPARATUS AND METHOD.

Figure 7:
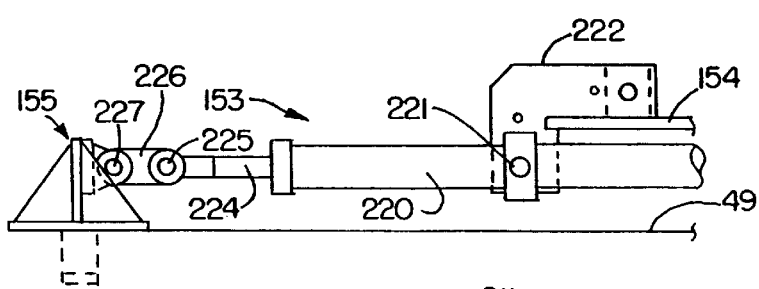
FIG. 7 is a somewhat enlarged fragmentary view of the extruder traverse mechanism.

The traversing unit for the one or more extruders utilizes a significantly longer hydraulic piston-cylinder assembly actuator seen at 220 in FIG. 7. The cylinder of the piston-cylinder assembly is mounted through a pivot at 221 to bracket 222 secured to the extruder carriage base 154. The rod 224 of the actuator 220 is pivoted at 225 to compensating link 226 in turn pivoted at 227 to the stationary anchor 155 secured to the floor 49. The stroke of the piston-cylinder assembly 220 is substantially longer than the stroke of the die adjustment cylinder actuator 208. For example, the stroke of the cylinder assembly 220 may be on the order from about 370 cm (145.67 in) to about 450 cm (177.17 in) and will move the extruders a substantial distance. However, in operation, the piston-cylinder assembly 208 of the die adjustment will normally override the piston-cylinder assembly 220, and the valve 211 may include a neutral position permitting slight axial movements of the die carriage and thus the die with respect to the fixed bulkhead to compensate for temperature and pressure variations.

Referring now to FIGS. 9 and 10, there is illustrated a preferred form of locking mechanism 230 for the chamber, the location of which is shown by the arrow at the top of FIG. 1A. The locking mechanism may comprise a series of relatively low profile piston-cylinder assemblies 231 mounted on fixed brackets 232 on the exterior of the fixed section 47 of the vacuum chamber. Each piston-cylinder assembly is pivoted to its bracket at 233. The rod 234 of the assembly 231 is pivoted at 235 to triangular crank link 236 pivoted at 237 to the bracket 232. Also pivoted to the crank link 236 at 238 is a toggle link 239 pivoted also at 240 to dog leg link 241 which is in turn pivoted at 242 to the bracket 232. The bent distal end 243 of the link 241 is adapted to engage a pad 244 on the end of the moving or telescoping vacuum chamber section 46.

In FIG. 9, the toggle locking mechanism is shown retracted, and the link 241 is clear of the telescoping section 46, so that it may then move to the right as seen in FIG. 9. In FIG. 10, the toggle lock mechanism is shown in the locked position. The piston-cylinder assembly has extended to pivot the crank link 236 about the pivot 237 moving the pivot 238 causing the dog leg link 241 to pivot to the position shown so that the end 243 of the link 241 is against the pad. The three pivots 240, 238 and 237 form the toggle lock with the middle pivot slightly over center. When in the locked position seen in FIG. 10, the seal shown generally at 246 may then be inflated sealing the vacuum chamber for evacuation or pressurization. The details of the seal are seen more clearly in FIG. 11.

The seal 246 in FIG. 11 is shown between the fixed bulkhead 36 and the opposite end of the traveling vacuum chamber section 46. The traveling section 46 includes a flange 247 with rings 248 and 249 projecting axially toward the fixed bulkhead 36 and forming an axially facing channel form groove. Seated between the rings is a seat 250 for the inflatable gasket shown at 251. The seat 250 snugly fits in the axially facing channel-form groove, and the gasket may include two snap-in ears seen at 252 and 253 allowing the gasket easily to be inserted and replaced. The gasket is in the form of an inflatable O-ring which includes an axially facing ridge 255 which compresses against the interior of the fixed bulkhead when the seal is inflated. In the FIG. 1A embodiment, the seal shown in FIG. 11 will be provided at the left hand end of the traveling section 46. The seal at the right hand end will be as shown in FIG. 9 and 10.

In the FIG. 2, 3 and 4 embodiments, the seal between the traveling section 130 and the fixed bulkhead 106 will be as shown in FIG. 11. The seal between the two traveling sections 130 and 131 will be the same as shown except that the seal will expand against a flange on the opposite traveling section. The seal between the fixed section 47 and the traveling section 131 will be as shown in FIGS. 9 and 10. The flange or plate closing the end of the traveling section 131 will, however, include an eccentric opening for the smaller diameter fixed section 47.

With reference to FIG. 12, it will be seen that the dancer roll 65 is positioned between the outer end of the arms of arm assembly 66. The roll 65 may be provided with a urethane covering. The arm assembly is pivoted at 260 to bracket 261. The pneumatic piston-cylinder assembly 67 which will cause the arm assembly to pivot upwardly or float to the phantom line position seen at 262. The assembly 67 is pivoted at its blind end at 263 to vertically adjustable bracket 264 which may be mounted on the bulkhead 62 or 134, for example. The rod of the piston-cylinder assembly is pivoted at 265. As is apparent from the several embodiments illustrated, the dancer roll assembly may be mounted on the bulkhead to face in either an upstream or downstream direction. In any event, the piston-cylinder assembly will urge the roller 65 upwardly into a floating position beneath the extrudate passing thereover. The pivot 260 includes a rotary encoder 267 which is used to sense the position of the roller 65, and this becomes an analog control of the tension on the extrudate as it passes over the bulkhead on which the roller is mounted and begins its decent into the vacuum chamber section of the water baffle seal to be immersed and to exit the chamber to atmosphere.

Figure 13:
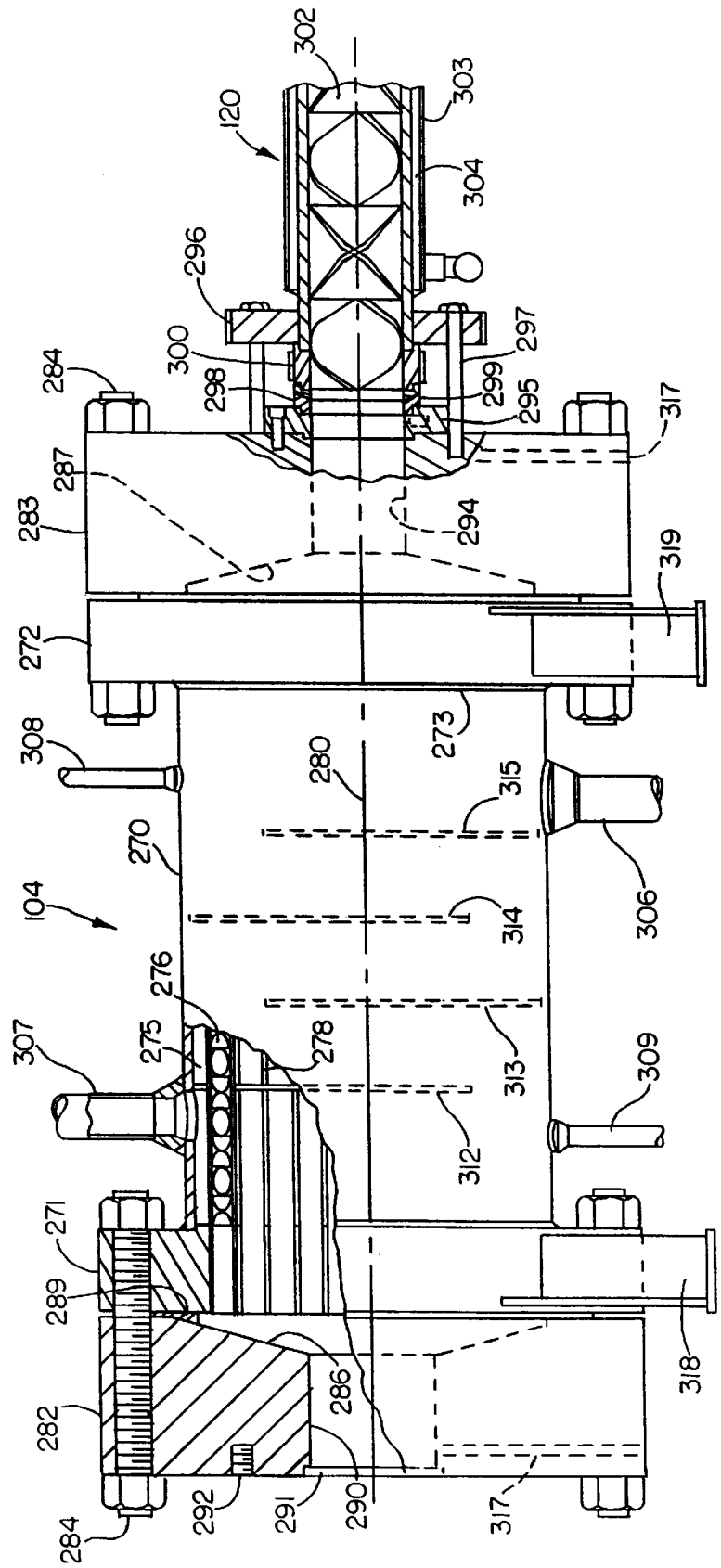
FIG. 13 is an enlarged fragmentary view partially broken away of the mixer-cooler and die supporting gel tube which is mounted on the die carriage.
Figure 14:
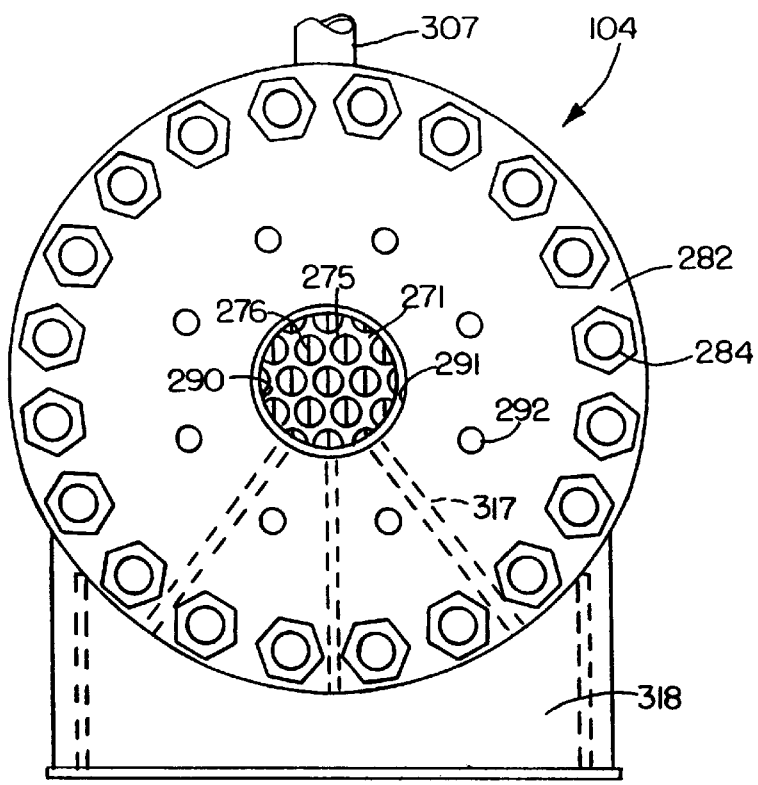
FIG. 14 is an end elevation of the mixer-cooler as seen from the left hand side of FIG. 13.
Figure 15:
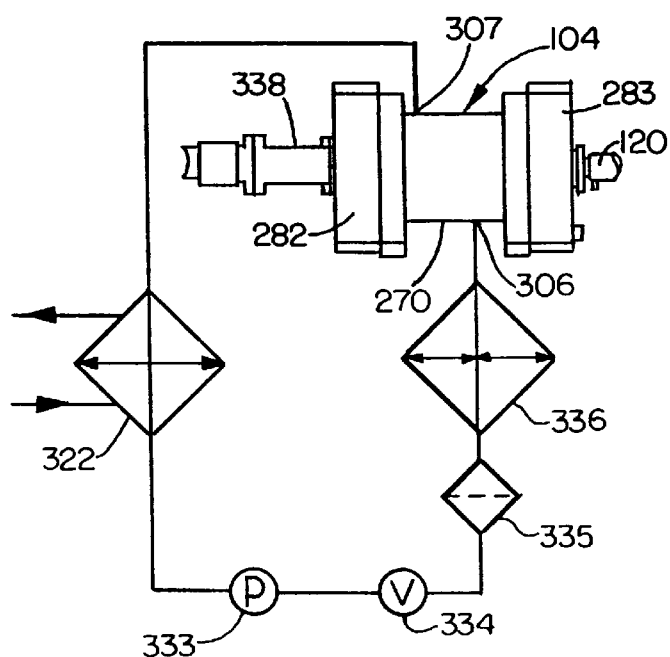
FIG. 15 is a schematic illustration of the mixer-cooler illustrating the coolant flow and temperature controls.

Referring now to FIGS. 13–15, it will be seen that the mixer-cooler unit 104 includes a shell 270 extending between axially spaced tube sheets or plates 271 and 272. The shell 270 is seated on slight shoulders on the interior of the tube sheets and welded as indicated at 273. Extending through the tube sheets within the shell 270 are a large number or bundle of mixing tubes shown generally at 275. Each tube within the shell is provided with the sets of curved mixing elements 276 so that each tube is a static mixer. The blades 276 are curved and cause the melt moving through the tube to move or rotate around the tube axis. The static mixers of each tube may be of the type made and sold by Cemineer-Kenics of North Andover, Mass., USA. Although not shown, each of the tubes within the bundle is provided with the curved elements of a static mixer. In the illustrated embodiment there may be in excess of 90. For large volume throughputs, the number of mixing tubes in the bundle may be as many as 225 to 300 or more.

The tubes of the bundle are slightly spaced as indicated at 278. The bundle of tubes, regardless of the number, is arranged so that the bundle is symmetrical with the mixer and machine axis shown at 280. The tubes are all parallel to such axis and the transverse dimension of the bundle is as close to circular as possible and centered on the axis 280. In this manner, the tube bundle faces projecting through the tube sheets may be covered by conical heads or plenums seen at 282 and 283 connected to the tube sheets by the ring of bolt fasteners shown generally at 284. Each head is provided with a widely flaring conical recess as seen at 286 and 287. The outer or wider end of each conical recess closely circumscribes the projecting ends of the tube bundles. A filler indicated at 289 circumscribes the bundle and minimizes dead space in the melt flow path. The inlet head 282 is provided with an axial inlet passage 290 provided with a shoulder 291 and surrounded by tapped holes 292. In this manner, a standard ANSI flange connection may be secured to the inlet head.

The outlet head is provided with an aligned axial outlet 294 which is somewhat smaller in diameter than the inlet 290. Secured to the downstream face of the head 283 is a flange adaptor 295. The gel tube 120 has a ring 296 threaded on the end thereof held to the head by the fasteners 297. Alignment rings 298, 299 and 300 having mating conical surfaces are interposed between the gel tube and the flange 295. The interior of the gel tube is provided with static mixer elements indicated at 302 which continually rotate the melt about the axis 280. The tube may be provided with an outer shell 303 enclosing insulation 304.

The mixer-cooler is provided with an inlet indicated at 306 and an outlet 307. In addition, the shell is provided with a vent 308 and a drain 309. In the illustrated embodiment, the inlet 306 is on the bottom, while the outlet 307 is on the top. Situated between the inlet and the outlet are a series of baffles seen at 312, 313, 314 and 315. The baffles 312 and 314 extend from the top of the shell, while the baffles 313 and 315 extend from the bottom of the shell, requiring the coolant circulated through the shell to move in a sinuous or sinusoidal path through the tube bundle. In the illustrated embodiment, the coolant will pass the majority of the tubes of the bundle five times.

As indicated in FIGS. 13 and 14, the heads 282 and 283 may be provided with radial ports 317 enabling the mounting of pressure or temperature sensors at the inlet and outlet, respectively. The tube sheets 271 and 272 are provided with downwardly projecting supports 318 and 319 which support the mixer-cooler on the stand 116.

With reference to FIG. 15, it will be seen that the coolant leaving the outlet 307 passes through a heat exchanger 322 where heat is extracted. The coolant then passes through the circulating pump 333, a control valve 334, filter 335, and finally through temperature regulator 336 before moving back into the shell 270 through the inlet 306. The circulating coolant may be water with appropriate additives.

Regardless of the number of tubes in a bundle, the mixing tubes in each bundle may be approximately 3.17 cm (1.25 in) in diameter. The doubling or even tripling of the number of tubes in a bundle does not significantly change the overall dimension of the mixer-cooler. For example, the overall height of a mixer-cooler with about 90 bundles is 84 cm (33.07 in), while one with about 229 tubes in a bundle is approximately 120 cm (47.24 in) in height. The varying dimension mixer-coolers can be accommodated simply by tailoring the height of the carriage 116. To achieve the noted throughput, number of tubes in the bundle is approximately 229.

It is noted that the size of the inlet to the mixer-cooler is substantially larger than the outlet. The inlet may be on the order of 15.2 cm (5.98 in) in diameter, while the outlet is approximately 13.7 cm (5.39 in). If the individual mixing tubes of the bundle each have an inside diameter (ID) of about 2.54 cm (1 in), the ratio of the transverse area of the interior of the tube bundle to the inlet area is approximately 6.36, while the transverse area to the outlet may be approximately 11.31, both of which are well more than a ratio of about 2 to 1.

produce uniform cellular structures at large throughputs, without cell collapse, excessive cell size or open cells.

The design parameter ranges for the mixer-cooler which enable the production of such high quality low density foam board in the sealed chamber system illustrated are:

|  | Approximate Minimum | Approximate Maximum |
|---|---|---|
| Extrusion Rate | 453.59 kg/hr (1000.0 lb/hr) | 1360.78 kg/hr (3000.0 lb/hr) |
| Melt Temperature | 123.88° C. (250° F.) | 135° C. (280° F.) |
| Melt Viscosity (CP) | 15,000,000 | 30,000,000 |
| SC Pressure Drop ΔP | 25857.45 mm-mg (500.0 psig) | 77572.35 mm-mg (1500.0 psig) |
| Tube Size - ID | 2.54 cm (1.0") | 3.81 cm. (1.5") |
| Tube Length | 60.96 cm (24.0") | 152.4 cm (60.0") |
| No. of Tubes with Mixing Elements | 96 | 300 |
| Shear Rate/Tube | 1 sec$^{-1}$ | 10 sec$^{-1}$ |

It will be appreciated that these ratios considerably slow the movement of the melt through the mixing tubes enabling the efficient and uniform extraction of heat. With the mixer-cooler of the present system, the melt temperature may be controlled to within 1° F. (0.5° C.).

In this manner, the viscosity of the melt at the die can be closely controlled to be within certain ranges necessary to produce quality and uniform product. For example, a board 122 cm (48.03 in) wide and 10.16 cm (4 in) thick has a cross-sectional area of approximately 1,240 square cm (192.2 square inches). To produce this type of product avoiding cell collapse, non-uniform cell structure, or less than prime production, a critical viscosity range of from about 25,000,000 to about 30,000,000 centipoise would be desirable. For a similar product but only 2.5 cm (1 in) thick and as small as about 80 cm$^2$ (12.4 in$^2$), a lower viscosity range of from about 15,000,000 to about 20,000,000 centipoise would provide the optimum foam quality.

In this manner, the mixer-cooler can be operated as a viscosity control device, as the melt viscosity through the mixer-cooler is a function of the rheological properties of the melt which is proportional to the shear rate and foaming temperature. Also, the viscosity is affected by the amount of blowing agent in the melt and, to a lesser degree, by extrusion additives. Therefore, for any given extrusion rate, control of the required critical viscosity range is obtained by controlling the melt temperature in the mixer-cooler. The critical viscosity for a given product can be established by measuring the overall pressure drop through the mixer-cooler and calculating the absolute viscosity which is then used to establish the optimum product performance. These ranges may vary considerably depending on operating conditions, and once achieved empirically can be repeated with precision.

Shear rate is proportional to the rate at which the polymer melt experiences shear stress, and this is normally measured in inverse seconds (sec$^{-1}$). In the operation of the system, it is important that the tubes and mixing elements of the mixer-cooler be sized to place the overall shear rate at an operating range which will not induce additional melt shear from the mixing elements. A shear rate range for each individual tube at the length and diameter ranges given below should be from about 1 to about 10 sec$^{-1}$. Maintaining the shear rate along with the temperature permits the proper control of the polymer melt viscosity which is important to It is also noted that the static mixer incorporated in the gel tube 120 between the mixer and die helps to alleviate any tendency for the thermal gradients to reappear between the mixer and the die. It is also of some benefit to incorporate a static mixer in the relatively short section of piping indicated at 338 in FIG. 15, having the elements of the static mixer seen at 302 in FIG. 13. A static mixer at such location will reduce or minimize the thermal gradients going into the unit 104.

Although as indicated, the parameters are to some extent empirical, the mixer-cooler and its ability to achieve the appropriate critical viscosity ranges for the various size boards or extrudates being produced are very important in the production of both large and small quality product with the sealed chamber system. The transformation of the product from the vacuum chamber, where the product is in an amorphous state and continuing to grow, to the atmosphere through the immersion water baffle seal cooler, makes the narrow range viscosity controls particularly beneficial. It avoids such problems as cell collapse and non-uniformity of cell structure, particularly with the low density ranges which are achievable with vacuum foaming. For example, low density foams in the range of approximately 0.016 grams per cubic centimeter (1 pound per cubic foot) to 0.096 grams per cubic centimeter (6 pounds per cubic foot) may be made with proper viscosity range control with uniform cellular structure and without cell collapse as the extrudate moves through the water baffle seal and to atmosphere.

Figure 16:
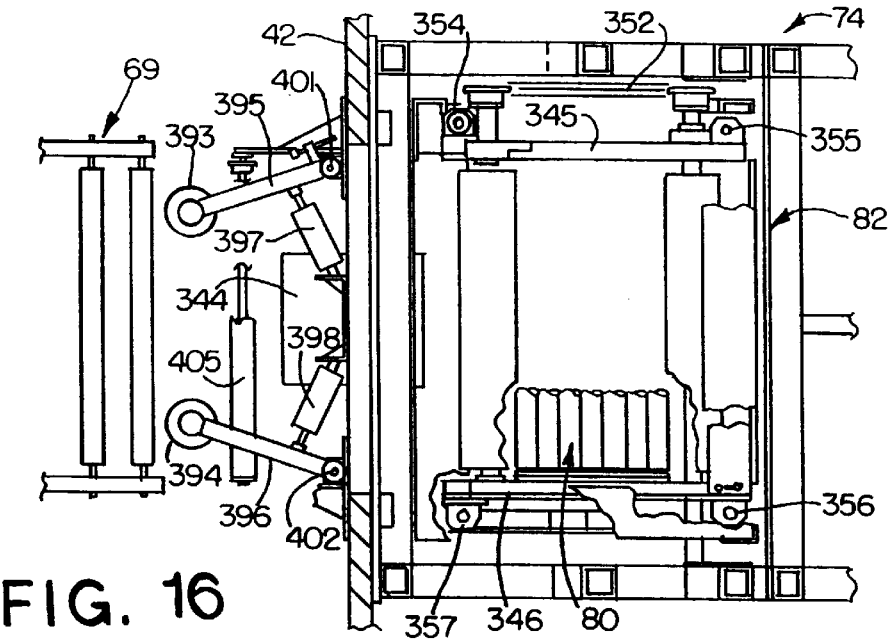
FIG. 16 is a fragmentary top plan view partially broken away of the hood and submerged orifice of the water baffle seal.
Figure 17:
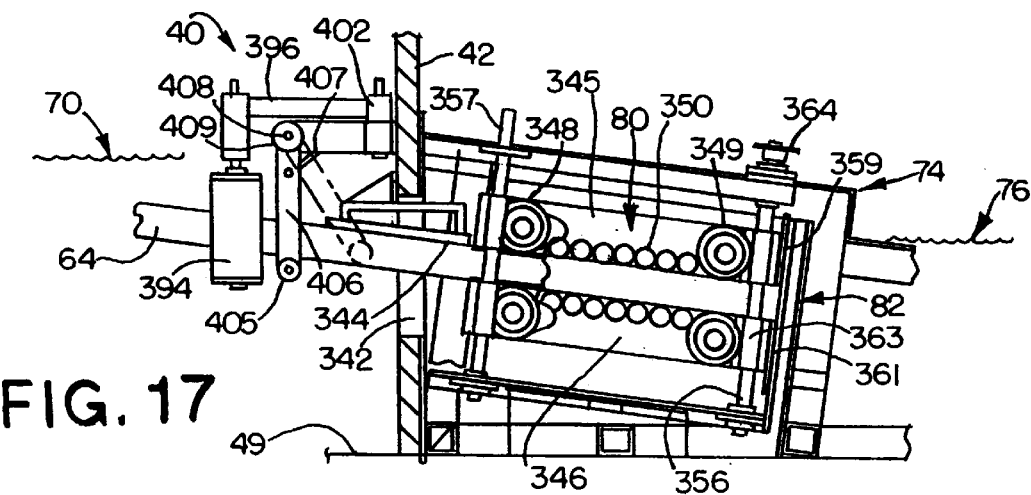
FIG. 17 is a broken side elevation of the hood and orifice illustrating the close-pack guide roller system upstream of the orifice.
Figure 18:
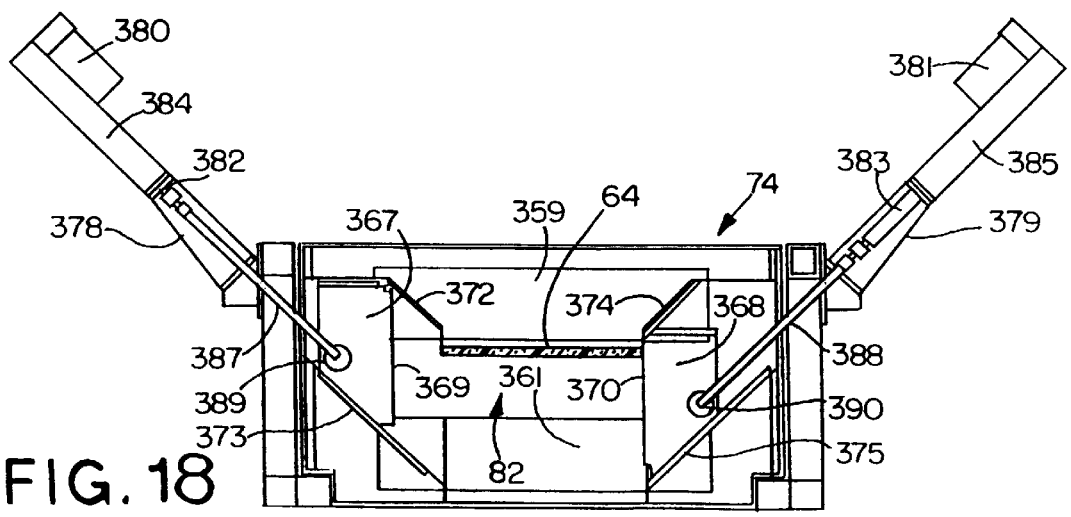
FIG. 18 is a transaxial view of the hood and orifice illustrating the side gates and actuators.

The window or orifice 82 through which the extrudate passes from the vacuum chamber portion of the pond indicated at 70 to the atmospheric portion indicated at 76 is shown and described in more detail in FIGS. 16–18. The down stream end of the vacuum chamber 40 includes the bulkhead 42 which has a sizeable window 342 which communicates with the interior of the hood 74. The hood 74 projects from the downstream side of bulkhead into the pond containment 75. The extrudate 64 seen in FIG. 17 moves downwardly at an angle beneath the water level 70 as guided by the conveyor system 69. The floating extrudate passes beneath a platen 344 positioned at the appropriate inclination in the upper portion of the window 342. From beneath the platen the extrudate enters between the guide rollers of the close-pack roller set 80. The guide roller set includes a top roll set and a bottom roll set with each journaled in frames 345 and 346. Each close-pack roller set includes larger end rolls seen at 348 and 349 which may be provided with urethane covers. Positioned between such rolls are a closely spaced or packed set of idler rolls indicated at 350.

The idler rolls are tangent to a line also tangent to the interior of the end rolls. The opposed major end rolls of each set may be power driven, but only on start up. The opposed rolls on the opposite side of the extrudate may be driven to advance the extrudate by the transmission shown generally at 352 in FIG. 16. When the line is operating on a continuous basis on the vacuum, all the rolls of each set will free wheel or idle.

The two frames are mounted on four corner guide posts seen at 354, 355, 356 and 357. The upper frame is normally fixed on such posts, although it may be moved for adjustment purposes only during initial set-up. The upper frame includes a fixed gate or shutter indicated at 359 forming the top edge of the underwater orifice 82. All of the other edges of the orifice are adjustable on a continuous basis.

The bottom edge of the orifice is formed by the shutter or gate 361 which is mounted on the front of the frame 346 for the lower close-pack guide roll set. Movement of the lower gate or shutter 361 is obtained by rotating the posts in common directions with a nut follower element being provided in the bosses 363 through which an appropriate screw portion of the posts extend. The posts may be rotated through the drive seen at 364 and the motor 365 seen schematically in FIG. 19. Thus not only does the bottom gate 361 of the orifice move up and down, so does the entire bottom close-pack guide roll set.

The two lateral shutters or gates are shown at 367 and 368 in FIG. 18. These shutters each have a vertical edge which may be suitably rounded as indicated at 369 and 370, respectively. The gate 367 is mounted on parallel tracks 372 and 373, while the lateral gate 368 is mounted on parallel tracks 374 and 375. The tracks are inclined at about 30° to about 45° and are symmetrical with each other.

Projecting from the exterior of the hood are brackets 378 and 379 which accommodate reversible motors 380 and 381, respectively. The motors 380 and 381 drive screw jacks 382 and 383 projecting from housings 384 and 385, respectively. The screw actuators are connected to links 387 and 388 pivotally connected to the respective gates at 389 and 390. It is noted that for illustrative purposes only, the gate 369 is shown fully retracted, while the gate 368 is shown nearly fully extended. Movement of the lateral gates controls the width of the orifice 82. Movement of the bottom shutter 361 controls the height or thickness of the orifice. Also, for range illustrative purposes only, the extrudate in FIG. 18 is shown considerably smaller than that of FIG. 17.

Figure 20:
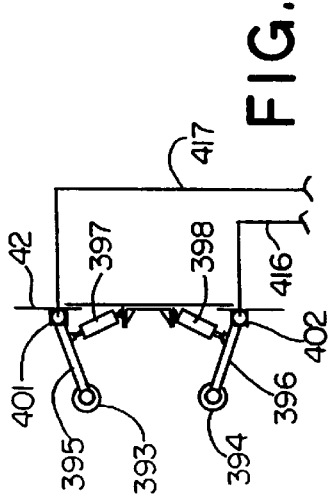
FIG. 20 is a schematic continuation of FIG. 19 illustrating the edge sensing rollers controlling the respective sides or lateral edges of the orifice.
Figure 19:
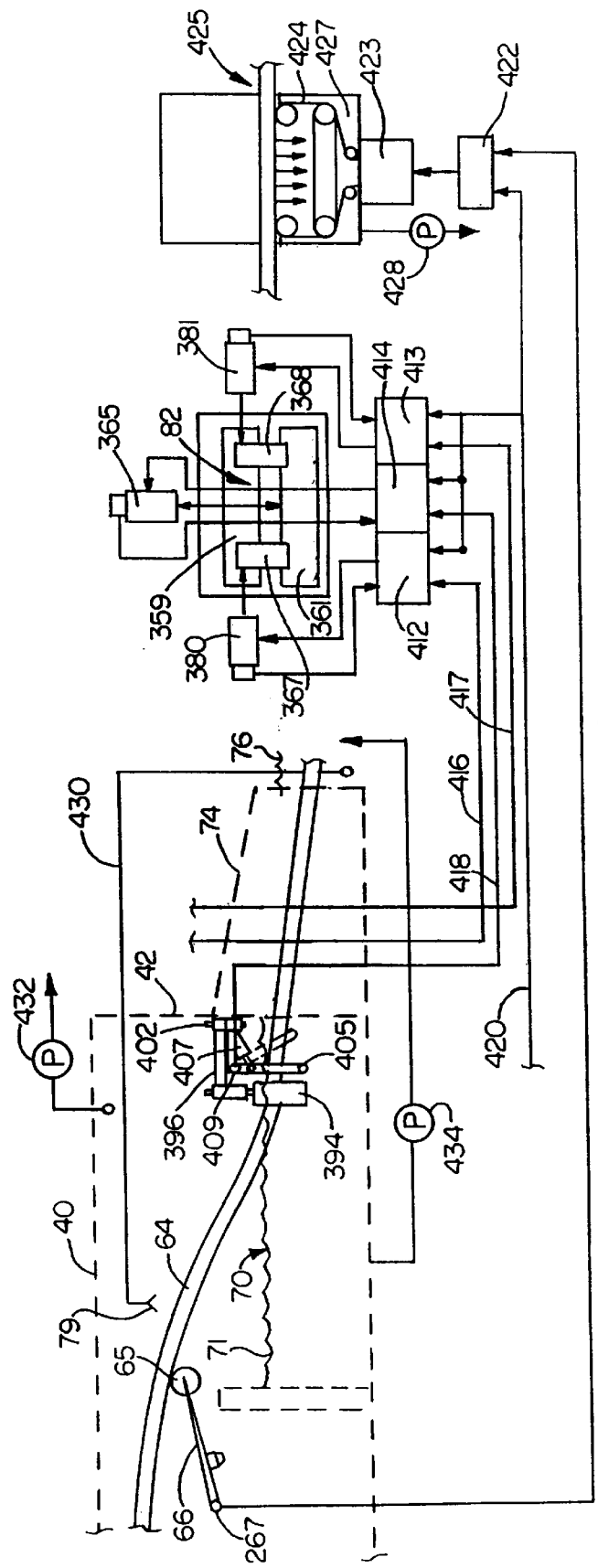
FIG. 19 is a schematic view illustrating the operation of the sensor rollers at the orifice controlling the bottom and lateral edges of the orifice, and the dancer roll controlling the vacuum table tractor.

Referring now additionally to FIGS. 19–20, it will be seen that the gates or shutters are moved continuously in response to the geometric parameters such as the dimensions or positions of the extrudate as it moves through the pond and into the hood. Immediately upstream of the hood and mounted on the bulkhead 42 are extrudate edge sensing rollers 393 and 394, each mounted on a swing arm 395 and 396, respectively. Cylinder actuator assemblies 397 and 398 urge the rollers toward each other or toward the edges of the extrudate passing therebetween. The vertically elongated rollers are on a vertical axis as are the proximal pivots for the respective arms. At such proximal pivots there is provided rotary encoders 401 and 402, respectively. It is noted that the rollers 393 and 394 are axially underwater, while the supporting arms 395 and 396 as well as the pneumatic piston-cylinder assemblies and the rotary encoders are above the waterline.

The thickness of the extrudate is measured by an underslung roller 405 mounted between the distal ends of arms of arm frame 406. A cylinder assembly 407 urges the arm frame in a counterclockwise direction as viewed in FIG. 17 about its upper pivot 408 which includes a rotary encoder 409. In this manner, the platen 344 above the extrudate acts as a backstop for the roller 405, and the position of the encoder is an analog measurement of the thickness of the extrudate. Again, the rotary encoder is above the water level, while the roller 405 is beneath the water level.

As seen in FIG. 19, each of the three motors 380 and 381 for the lateral gates, and 365 for the bottom shutter or gate, is controlled by a respective motion controller seen at 412, 413 and 414. The motion controllers are preferably of the digital PID (proportional integral-derivative) type and take into account a programmed factor of product change from the position of the sensor rolls to the orifice. The rotary encoders on the pivots of the arms illustrated are connected to the respective PID controllers. The encoder 402 is connected to the controller 412 by the line 416. The encoder 401 is connected to the controller 413 by the line 417, while the encoder 409 is connected to the controller 414 by the line 418. The controllers are also connected to the main process controls through the line 420.

FIG. 19 also illustrates the dancer roll 65 supported on the arm frame 66 and operating the encoder 267. In the embodiment of FIG. 19, the encoder 267 operates a PID controller 422 which controls drive 423 for a foraminous belt 424 in a vacuum table shown generally at 425. The vacuum table may be employed in place of the tractor drive illustrated in FIG. 1B. A vacuum in chamber 427 is created by the vacuum pump or blower 428, and the level of vacuum may be controlled by the blower or pump speed. The level of vacuum is sufficient to hold the extrudate 64 to the vacuum foraminous belt without damage, and the drive 423 pulls the extrudate to the right as seen in FIG. 19. The controller 422 is also controlled from the central process controls through the line 420. Again, the position of the dancer roll, over which the extrudate passes, controls the belt drive 423 to control the tension on the extrudate from the shaping or calibrating equipment in the vacuum chamber through the immersion pond, through the submerged orifice, through the blow off, and into the cutting and processing equipment at the tail end of the process.

Spray nozzles 79 are also shown in FIG. 19. The nozzles are supplied by one or more lines 430 which extend to the atmospheric pond section 76. When the sealed chamber is evacuated as by the vacuum pump 432 water will be drawn into the chamber to be sprayed on the extrudate or foam board 64 before it enters the pond section so the water will be recirculated to the atmospheric section 76 by the circulating pump 434. If not above the pond a special sump may be provided.

It can now be seen that there is provided a process and apparatus for producing high quality foams at low density, and for producing such foams with high and efficient throughput.

To the accomplishment of the foregoing and related ends, the invention then comprises the features particularly pointed out in the claims, these being indicative, however, of but a few of the various ways in which the principles of the invention may be employed.

We claim:

1. An extrusion system comprising an extruder, a sealable chamber, a die forming an extrudate inside and at one end of said chamber connected to the extruder, a water baffle seal at the other end of said chamber including a submerged orifice through which the extrudate passes to exit to atmosphere, and means to measure certain parameters of the extrudate to control the size of the orifice.

2. An extrusion system as set forth in claim 1 wherein the extrudate is generally rectangular, as is the orifice, and means to sense the location of each edge of the extrudate to adjust the edges of the orifice.

3. An extrusion system as set forth in claim 2 including means to measure the thickness of the extrudate to adjust the vertical opening of the orifice.

4. An extrusion system as set forth in claim 3 wherein the top of the orifice is fixed, and the means to measure the thickness of the extrudate adjusts the bottom edge of the orifice.

5. An extrusion system as set forth in claim 4 wherein the top edge of the orifice is fixed, and guide means to direct the extrudate through the orifice substantially contiguous to the top edge.

6. An extrusion system as set forth in claim 5 wherein said extrudate is buoyant and said guide means is a roller set limiting the vertical movement of the extrudate.

7. An extrusion system as set forth in claim 6 wherein said roller set includes spaced larger rolls with closely spaced smaller rolls therebetween.

8. An extrusion system as set forth in claim 7 including drive means to drive said larger rolls for system start-up.

9. An extrusion system as set forth in claim 8 including means to disconnect said drive means after system start-up so that all rollers of said roller set are idler rollers.

10. An extrusion system as set forth in claim 6 wherein the moveable bottom edge of the orifice includes a matching roller set.

11. An extrusion system as set forth in claim 6 including a platen above the extrudate upstream the roller set, and means to measure the thickness of the extrudate at the platen.

12. An extrusion system as set forth in claim 11 including a pivoted transverse sensing roller resiliently urged against the bottom of the extrudate at the platen to measure the thickness of the extrudate.

13. An extrusion system as set forth in claim 12 including edge engaging sensing rollers adapted to engage each edge of the extrudate to sense the location of each edge and to measure the width of the extrudate.

14. An extrusion system as set forth in claim 13 wherein each sensing roller is mounted on a swing arm, and means at the pivot of each arm to determine the position of each sensing roller.

15. An extrusion system as set forth in claim 14 wherein said list mentioned means comprises a rotary encoder creating feedback signals.

16. An extrusion system as set forth in claim 15 including respective motion controllers actuated by said feedback signals.

17. An extrusion system as set forth in claim 16 including reversible motors operated by each motion controller to move gates forming the respective lateral edges and bottom of the orifice.

18. An extrusion system as set forth in claim 17 wherein said gates forming the lateral edges are mounted on inclined tracks.

19. An extrusion system as set forth in claim 18 wherein said tracks extend at about 30° to about 45° with respect to the edge of the gate.

20. An extrusion system as set forth in claim 19 including a drive screw moving said gates along said tracks.

21. An extrusion system as set forth in claim 1 including haul-off means beyond the water baffle seal to pull the extrudate through the orifice.

22. An extrusion system as set forth in claim 21 wherein said haul-off means is a vacuum table.

23. An extrusion system comprising an extruder, a sealable chamber, a die forming an extrudate inside and at one end of the chamber connected to the extruder, a water baffle seal at the other end of the chamber including a submerged orifice through which the extrudate passes to exit to atmosphere, means to measure certain parameters of the extrudate to control the size of the orifice, and guide means upstream of the orifice to feed the extrudate through the orifice on system start-up while freewheeling when the system is in operation.

24. An extrusion system as set forth in claim 23 wherein said guide means comprises powered extrudate engaging rolls which are unpowered when the system is in operation to free wheel.

25. An extrusion system as set forth in claim 24 wherein said powered rolls are spaced axially of the extrudate and a series of smaller idler rollers closing such space.

* * * * *